United States Patent
Bouru (10) Patent No.: US 7,588,416 B2
(45) Date of Patent: Sep. 15, 2009

(54) PIVOT BUSHING FOR A VARIABLE-PITCH VANE OF A TURBOMACHINE

(75) Inventor: Michel Andre Bouru, Montereau sur le Jard (FR)

(73) Assignee: SNECMA, Paris (FR)

( * ) Notice: Subject to any disclaimer, the term of this patent is extended or adjusted under 35 U.S.C. 154(b) by 424 days.

(21) Appl. No.: 11/519,056

(22) Filed: Sep. 12, 2006

(65) Prior Publication Data
US 2007/0059161 A1    Mar. 15, 2007

(30) Foreign Application Priority Data
Sep. 14, 2005    (FR) .................................. 05 09378

(51) Int. Cl.
*F01D 17/16* (2006.01)
(52) U.S. Cl. ...................................... 415/160
(58) Field of Classification Search ................ 415/160, 415/163, 164, 165; 16/22, 23
See application file for complete search history.

(56) References Cited

U.S. PATENT DOCUMENTS

| | | | |
|---|---|---|---|
| 3,695,777 A * | 10/1972 | Westphal et al. ......... | 415/208.1 |
| 4,808,069 A * | 2/1989 | Bonner et al. ............... | 415/160 |
| 5,308,226 A * | 5/1994 | Venkatasubbu et al. ..... | 415/160 |
| 7,168,857 B2 * | 1/2007 | Hokkirigawa et al. ....... | 384/110 |
| 2002/0154991 A1 | 10/2002 | Bowen | |

FOREIGN PATENT DOCUMENTS

| EP | 1 205 638 A2 | 5/2002 |
|---|---|---|
| FR | 2 846 384 | 4/2004 |
| FR | 2 856 750 | 12/2004 |
| GB | 755527 | 8/1956 |

* cited by examiner

*Primary Examiner*—Ninh H Nguyen
(74) *Attorney, Agent, or Firm*—Oblon, Spivak, McClelland, Maier & Neustadt, L.L.P.

(57) ABSTRACT

A pivot bushing for a variable-pitch vane of a turbomachine, the bushing being for mounting in a recess in a ring of the turbomachine, the recess being of a shape that is substantially complementary to the shape of the bushing. The bushing comprises a substantially tubular body of longitudinal axis provided at one end with a first conical collar and at an opposite end with a second conical collar, the conical surfaces defined by the first and second collars being disposed facing each other.

15 Claims, 6 Drawing Sheets

PIVOT BUSHING FOR A VARIABLE-PITCH VANE OF A TURBOMACHINE

BACKGROUND OF THE INVENTION

The present invention relates to the general field of variable-pitch vanes for turbomachines, and more particularly to bushings for the guide pivots of such vanes.

The high pressure compressor of a turbomachine having a gas turbine typically comprises a plurality of circular stages of vanes of pitch orientation that can be adjusted in order to modify the gas flow characteristics depending on the operating speed of the turbomachine. Such vanes are referred to as variable-pitch vanes.

Each variable-pitch vane in a given stage has a respective control pivot at its head and a guide pivot at its root. The control pivot passes through a stator casing of the turbomachine and co-operates with a control member. By acting on said control member, it is possible to vary the orientation of the vanes in the corresponding stage. The guide pivot of each vane is movable in a bushing mounted in a corresponding recess in an inner ring of the turbomachine that is centered on the longitudinal axis of the machine.

When the vanes are assembled on the inner ring, it is important to ensure good centering of the vane guide pivots. Such centering is achieved by ensuring that the bushings and the recesses in the inner ring in which the bushings are mounted are accurately concentric. The quality of this centering of the vanes must also be maintained regardless of the conditions under which the turbomachine is operating.

Unfortunately, known mounts for bushings in the inner ring do not include any particular arrangement for ensuring that the quality of the centering is maintained. The centering of the vane guide pivot thus tends to become less effective in operation, in particular when the pivot support bushings and the inner ring are made of materials that present different coefficients of thermal expansion.

OBJECT AND SUMMARY OF THE INVENTION

A main object of the present invention is to thus to mitigate such drawbacks by presenting a bushing that is suitable for ensuring permanent centering quality for vane guide pivots, regardless of the conditions under which the turbomachine is operating and independently of the materials used for making the bushing and the inner ring in which the bushing is mounted.

To this end, the invention provides a pivot bushing for a variable-pitch vane of a turbomachine, the bushing being for mounting in a recess in a ring of the turbomachine, the shape of the recess being substantially complementary to the shape of the bushing, and the bushing comprising a substantially tubular body about a longitudinal axis, wherein the tubular body of the bushing is provided at one end with a first conical collar and at an opposite end with a second conical collar, the conical surfaces defined by the first and second collars being disposed facing each other.

The centering of the blade guide pivot is thus provided by a double-cone connection between the bushing and the recess in the ring in which the bushing is mounted. By means of such a connection, any offset movement due to the diameter of the ring expanding relative to the bushing is compensated by the expansion offset of the ring in the height direction. Furthermore, the position of the contacts between the conical surfaces defined by the collars remains permanent regardless of the expansions of the bushing and of the ring. In other words, the ends of the bushing carrying the conical collars perform a restoration function that is equivalent to displacement. The quality with which the blade guide pivots are centered thus remains permanent.

According to a particular characteristic of the invention, the angle of inclination of the conical surface defined by the first collar is substantially identical to the angle of inclination of the conical surface defined by the second collar. In addition, the angle of inclination of the conical surfaces defined by the collars lies in the range 30° to 60°, and is preferably 45°. Under such circumstances, the mean diameter of the conical collars is substantially identical to the longitudinal distance between them.

According to another particular characteristic of the invention, the bushing also includes means for preventing it from turning in the recess in the ring.

Such anti-rotation means may be in the form of at least one projection provided on the tubular body of the bushing between the collars, the projection defining a substantially plane surface for co-operating with a complementary surface in the recess in the ring in which the bushing is to be mounted.

Alternatively, the conical collars may present at least one substantially longitudinal external projection for co-operating with a member for preventing the bushing from turning in the recess in the ring.

In another alternative, one of the conical collars may include an anti-rotation plate provided with at least one surface for establishing substantially plane contact with a corresponding surface of an anti-rotation plate of an adjacent bushing.

The tubular body and one of the conical collars of the bushing may be two distinct parts so as to enable the bushing to be mounted in its recess.

According to another particular characteristic of the invention, the bushing may be made of a material having a coefficient of thermal expansion that is different from that of the ring in which the bushing is to be mounted.

The invention also provides a turbomachine ring including a plurality of recesses, each serving to receive the guide pivot of a variable-pitch vane, the ring further including a plurality of bushings as defined above.

The invention also provides a turbomachine compressor and a turbomachine including at least one ring as defined above.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
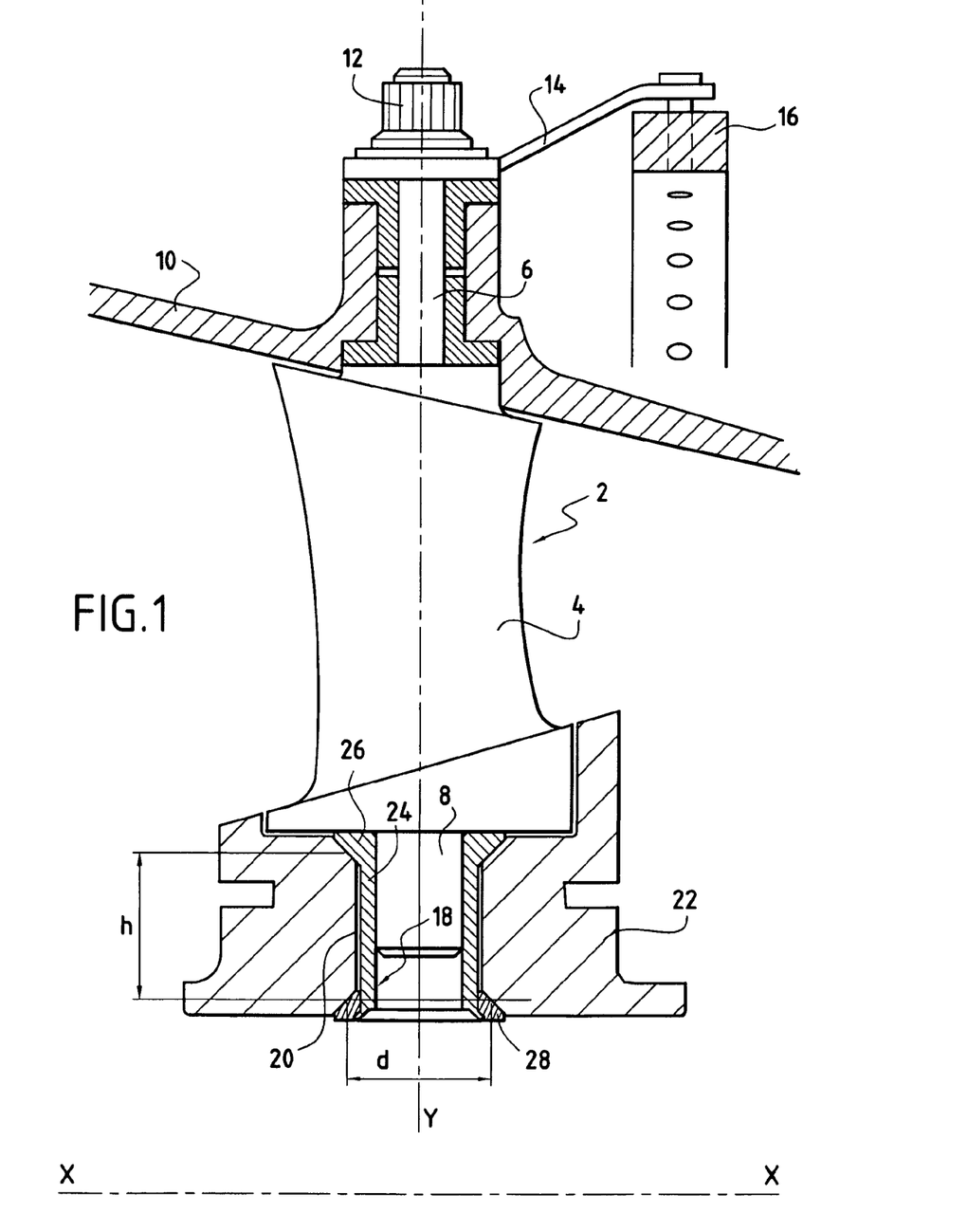
FIG. 1 is a section view of a bushing of the invention in its environment.

With reference to FIG. 1, the variable-pitch vanes 2 of the high pressure compressor of the turbomachine are distributed in circular stages centered on the longitudinal axis X-X of the turbomachine and they are disposed between stages of moving blades (not shown) which are secured on a rotor of the turbomachine.

Each variable-pitch vane 2 of a circular stage extends along a main axis Y-Y that is radial in direction relative to the longitudinal axis X-X of the turbomachine. The vane 2 is in the form of an airfoil 4 terminating at a radially outer end (or vane head) in a control pivot 6 (or top pivot) and at a radially inner end (or vane root) in a guide pivot 8 (or bottom pivot).

The control pivot 6 of the variable-pitch vane 2 centered on its main axis Y-Y passes through an annular stator casing 10 of the turbomachine and co-operates with a control member for varying the pitch of the vanes. More precisely, the control pivot 6 of each vane 2 projects radially to the outside of the stator casing 10 and terminates in a head 12 having one end of a control rod 14 engaged thereon, with the other end of the rod co-operating with a control ring 16 that is centered on the longitudinal axis X-X of the turbomachine.

The rods 14 and the control ring 16 form the member for controlling the pitch of the vanes. Turning the control ring 16 about the longitudinal axis X-X of the turbomachine serves to turn the control rods 14 and thus to modify simultaneously the pitch of all of the variable-pitch vanes 2 in a given stage of the high pressure compressor.

The guide pivot 8 of the variable-pitch vane 2 centered on its main axis Y-Y is for pivoting inside a hollow bushing 18.

Each bushing 18 is mounted in a recess 20 formed in an inner ring 22 of the high pressure compressor of the turbomachine, which ring is centered on the longitudinal axis X-X of the turbomachine, with the bushing and the recess being substantially complementary in shape.

Furthermore, an additional bushing (not shown in the figures) forming a ferrule can be mounted tightly around each guide pivot 8 of the vanes 2. Such an additional bushing, e.g. of substantially cylindrical shape, is interposed between the vane guide pivot and the bushing. It serves to avoid premature wear of the bushing.

Figures 2, 4:
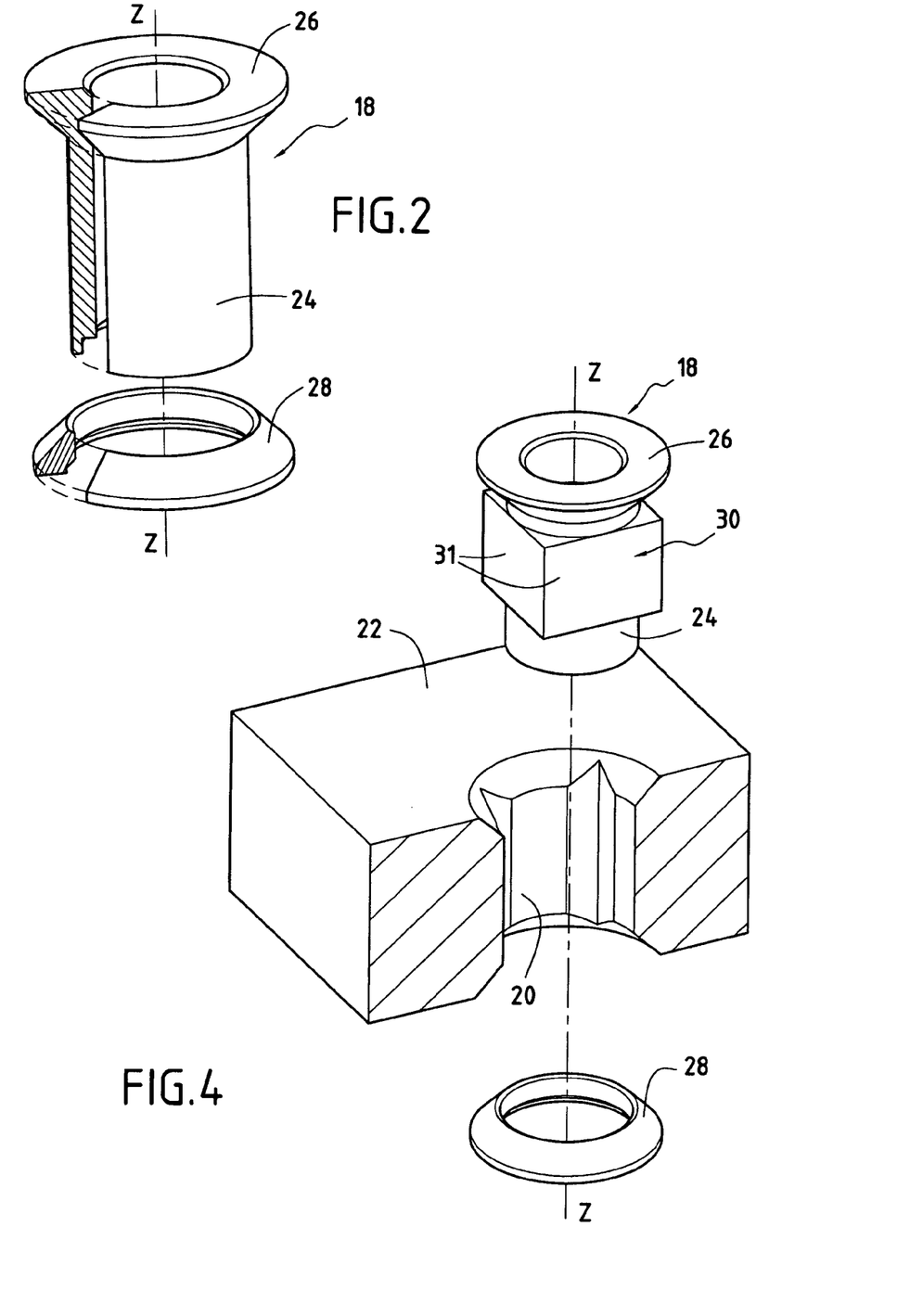
FIG. 2 is an exploded perspective view of the FIG. 1 bushing.
FIG. 4 is a perspective view of a bushing of the invention provided with anti-rotation means.

As shown in FIG. 2, the bushing 18 presents a substantially tubular body 24 of longitudinal axis Z-Z that is to receive the guide pivot 8 of a vane.

According to the invention, the tubular body 24 of the bushing 18 is provided at one end with a first conical collar (or shoulder) 26 and at an opposite end with a second conical collar 28, the respective conical surfaces defined by the first and second collars being disposed facing towards each other.

The conical collars 26, 28 thus project radially outwards from the tubular body 24 relative to its longitudinal axis Z-Z. The conical collars 26, 28 present substantially identical mean diameters d and the mean longitudinal height between them is written h.

As explained above, the recess 20 in which the bushing 18 is mounted is substantially complementary in shape to the bushing, i.e. it presents a central bore for passing the tubular body 24 of the bushing, and two conical surfaces against which the conical collars of the bushing come to bear.

The bushing 18 of the invention and the inner ring 22 in which the bushing is to be mounted can be made of materials having different coefficients of thermal expansion. By way of example, the bushing can be made of steel and the inner ring out of aluminum.

In order to enable the bushing 18 to be mounted in its recess in the ring, the tubular body 24 of the bushing and one of the conical collars may be in the form of two distinct parts as shown in FIGS. 1 and 2 (in these figures, the distinct collar is the second collar 28). Under such circumstances, once the tubular body 24 of the bushing has been mounted in its recess, the collar is put into place around the tubular body and is then secured thereto by any appropriate means (crimping, welding, bolting, etc.).

The angles of inclination of the conical surfaces defined respectively by the first collar 26 and the second collar 28 are substantially identical. This angle of inclination, which is measured relative to a plane extending transversely to the tubular body of the bushing (i.e. relative to a plane perpendicular to its longitudinal axis), advantageously lies in the range 30° to 60°, and is preferably 45°.

Figure 3A:
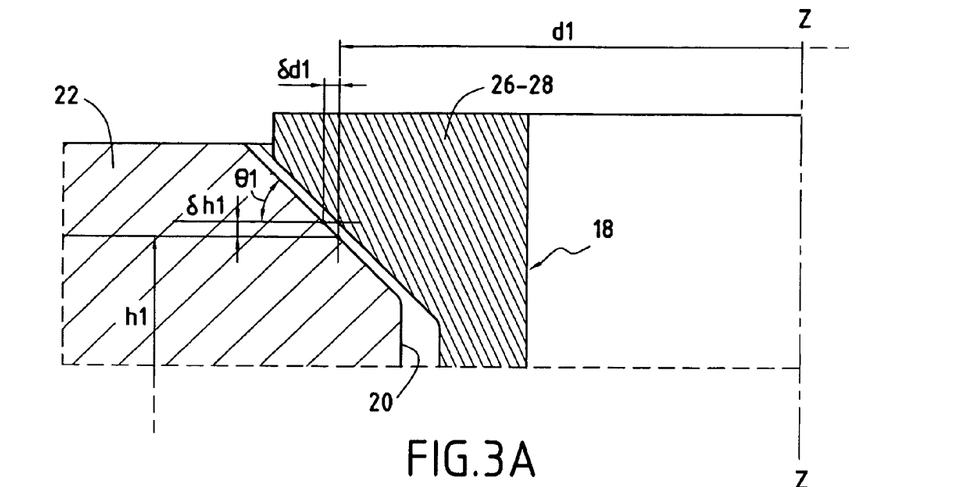
FIGS. 3A and 3B are fragmentary views of bushings constituting variant embodiments of the invention.
Figure 3B:
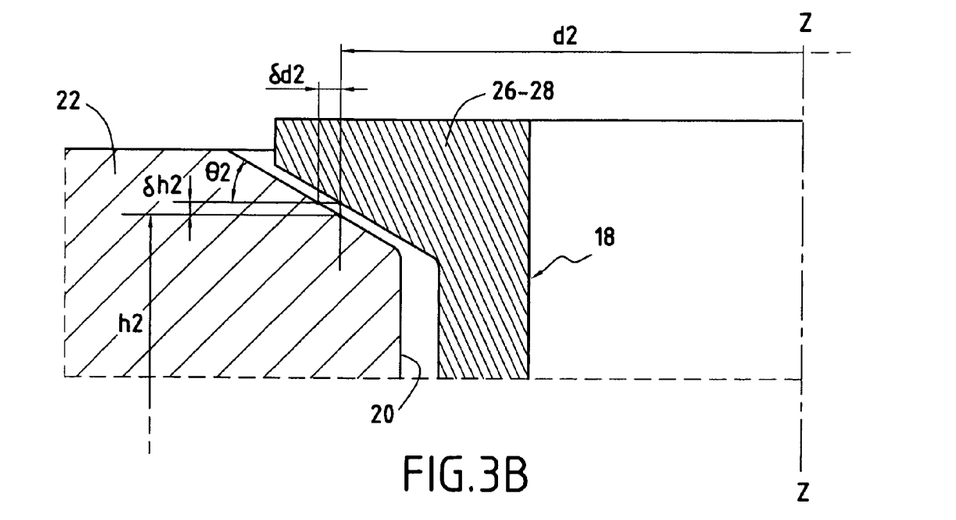

FIGS. 3A and 3B show the reasons for selecting the value of the angle of inclination of the conical surfaces defined by the collars of the bushing.

In the example of FIG. 3A, the mean diameter d1 of the collars 24 and 26 of the bushing 18 is selected to be substantially identical to the longitudinal distance h1 between them.

On the basis of this selection, in order to ensure that any offset movement due to expansion δd1 in the diameter of the ring 22 relative to the bushing 18 is compensated by the offset due to expansion δh1 in the height of the ring, it is necessary for the angle of inclination θ1 of the conical surfaces defined by the collars 26 and 28 to be 45°.

In the example of FIG. 3B, the mean diameter d2 of the collars 24 and 26 of the bushing 18 is selected to be greater than the longitudinal distance h2 between them.

Consequently, in order to ensure that any offset movement due to diameter expansion δd2 of the ring 22 relative to the bushing 18 is compensated by the offset movement due to height expansion δh2 of the ring, it is necessary for the angle of inclination θ2 of the conical surfaces defined by the collars 26 and 28 to be less than 45°.

Thus, the value selected for the angle of inclination of the conical surfaces defined by the collars of the bushing depends on the ratio between the mean diameter d of the collars of the bushing and the longitudinal distance h between them.

According to an advantageous characteristic of the invention, the bushing 18 further includes means for preventing it from turning in the recess 20 of the ring 22 in which the bushing is to be mounted. Such anti-rotation means for the bushing in its recess can be embodied in various ways.

Thus, in the embodiment of these means shown in FIG. 4, the tubular body 24 of the bushing 18 includes, between the conical collars 26 and 28, a projection 30 that defines at least one substantially plane surface 31 for co-operating with a complementary surface of the recess in the ring in which the bushing is to be mounted.

More precisely, the tubular body 24 of the bushing 18 presents four plane and rectangular faces 31 projecting radially outwards from the tubular body relative to its longitudinal axis Z-Z. These rectangular faces 31 co-operate with complementary rectangular faces formed in the recess in the ring.

Figure 5:
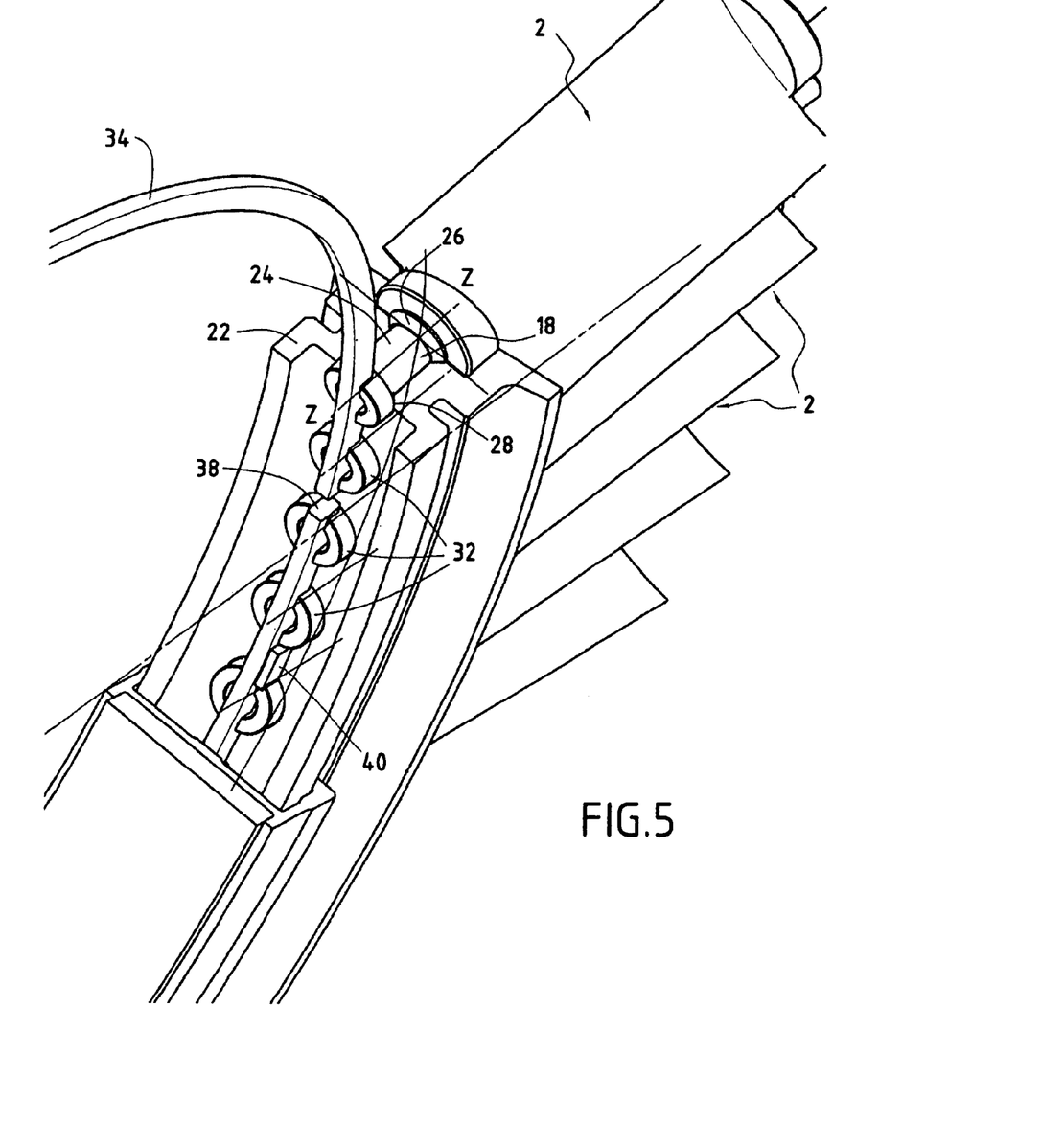
FIGS. 5 to 8 are perspective views of a partial ring provided with bushings constituting other variant embodiments of the invention.
Figure 6:
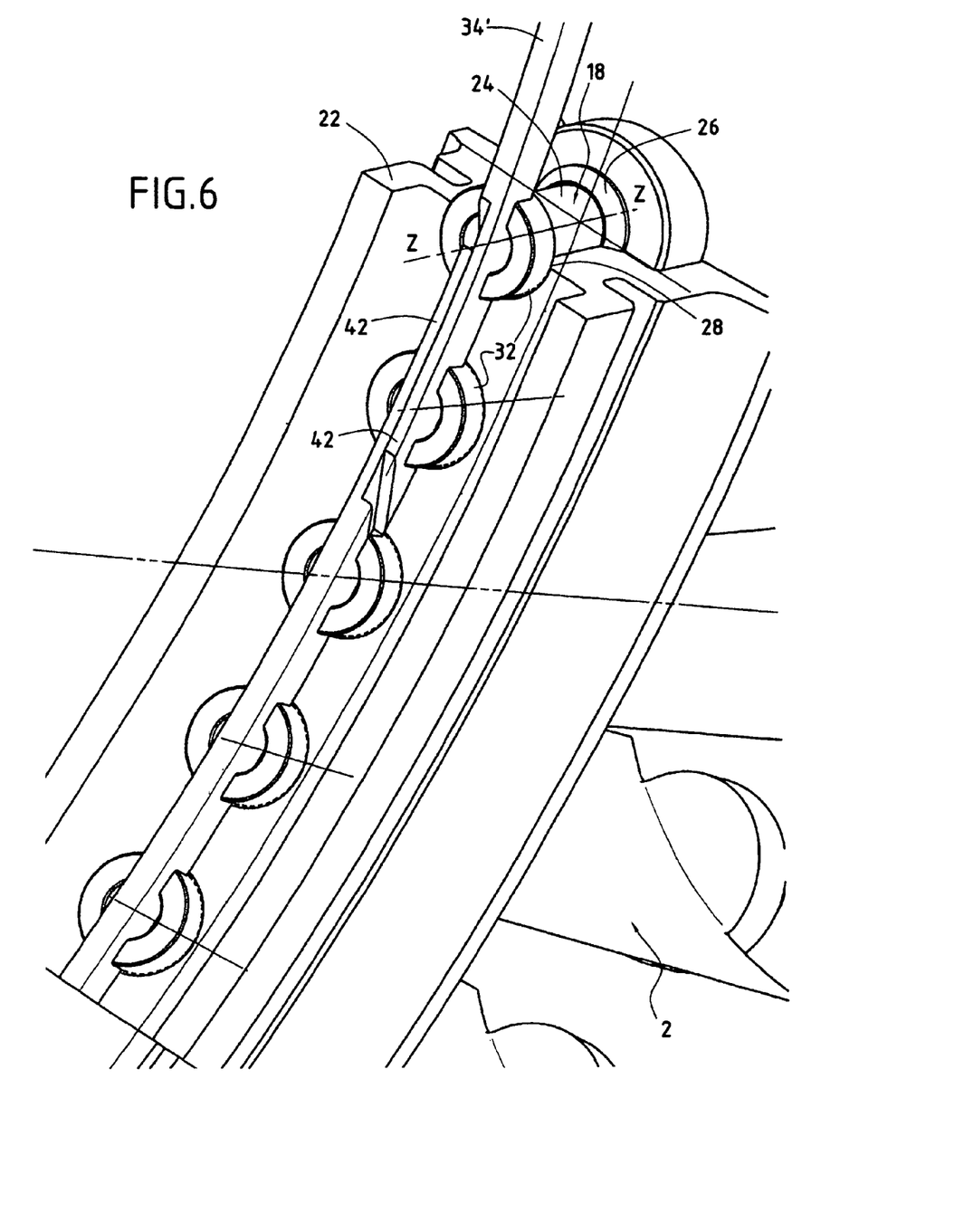

In a variant embodiment of the anti-rotation means shown in FIGS. 5 and 6, one of the conical collars (in this case a second collar 28) presents at least one external projection 32 extending along the longitudinal axis Z-Z of each bushing. This external projection serves to co-operate with an anti-rotation member 34, 34' for preventing the bushing 18 turning in the recess 20 in the ring 22.

The external projection 22 of each conical collar of the bushings is provided more precisely with a groove or slot that extends tangentially relative to the longitudinal axis of the turbomachine. An anti-rotation hoop 34, 34' of substantially rectangular right section is mounted on the bushings 18 in the slots formed therein. The hoop 34, 34' prevents the bushings from turning in their recesses.

In order to enable it to be mounted on the bushings, the anti-rotation hoop 34, 34' is split. Thus, in the embodiment shown in FIG. 5, the anti-rotation hoop 34 presents an open break 38 between two free ends. This embodiment then requires a projection 40 to be present for stopping the hoop 34 from rotating so as to avoid the open break 38 coming level with one of the bushings 18, with the resulting risk of the hoop becoming disengaged.

Alternatively (FIG. 6), the anti-rotation hoop 34' may be provided at its two free ends with extensions 42 of right section that is smaller than the section of the hoop and disposed so as to overlap when the hoop is mounted on the bushings 18. Thus, once mounted, the anti-rotation hoop 34' does not present an open break. As a result there is no need for a projection for stopping the hoop from rotating. In addition, the absence of an open break improves the mechanical strength of the anti-rotation hoop.

Figure 7:
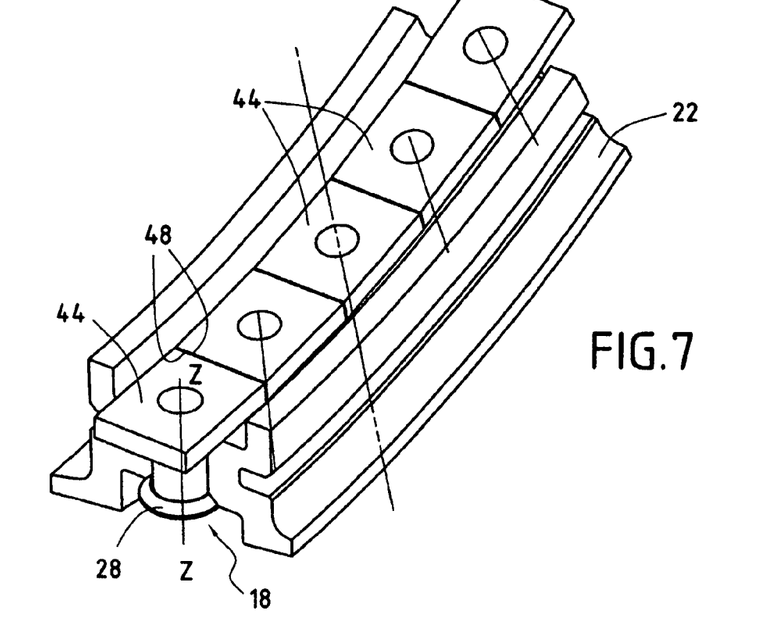
Figure 8:
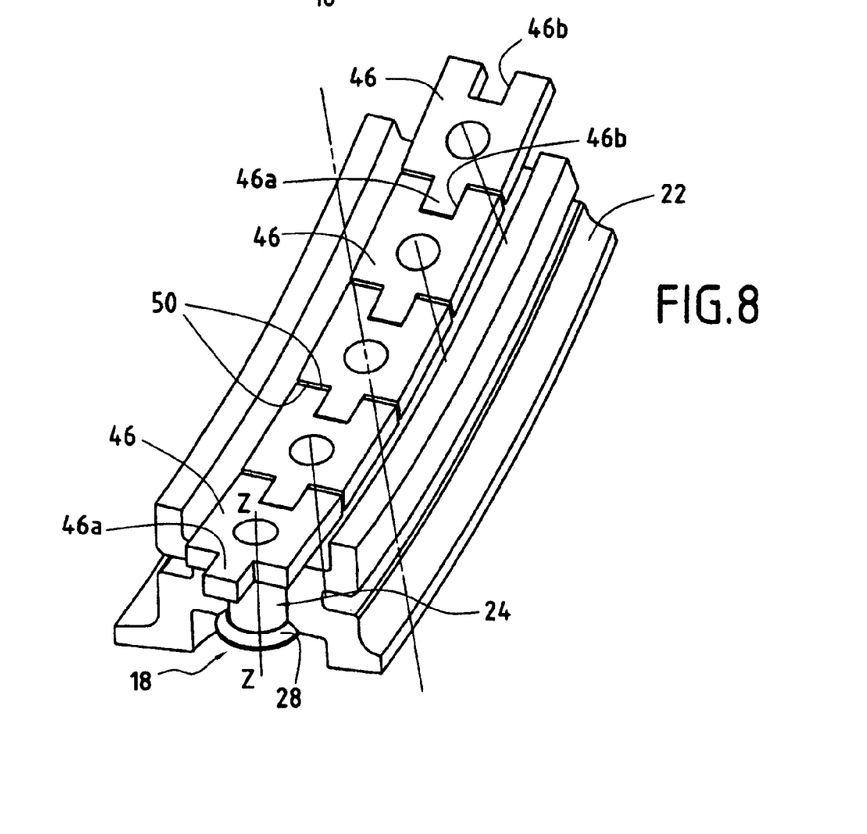

FIGS. 7 and 8 show other embodiments of the means for preventing the bushings from turning in their recesses in the ring.

In these embodiments, the bushings 18 are prevented from turning in their recesses in ring 22 by mutual engagement between bushings, and not in individual manner for each bushing.

To do this, one of the conical collars 26, 28 of a bushing 18 includes an anti-rotation plate 44, 46 provided with at least one surface 48, 50 for establishing substantially plane contact with a corresponding surface 48, 50 of an anti-rotation plate 44, 46 of an adjacent bushing. The anti-rotation plate 44, 46 can be made integrally with the conical collar 26, 28 of the bushing.

In FIG. 7, the anti-rotation plate 44 is substantially rectangular in shape. Similarly, in the variant embodiment of FIG. 8, the anti-rotation plate 46 is likewise substantially rectangular in shape, but it also possesses a tab 46a that is received in a complementary notch 46b in the plate 46 of the adjacent bushing. The presence of the tab that is received in the notch serves to increase the contacting areas of the plane surfaces 50, thereby increasing the anti-rotation effect.

Compared with the embodiment of the anti-rotation means for the bushings described with reference to FIG. 4, the use of plates presents the advantage of avoiding hammering phenomena when the ring in which the bushings are mounted is made of light material (e.g. aluminum). Because of the presence of the anti-rotation plates, the bushings do not bear against the ring (bearing forces are applied between the plates of adjacent bushings).

Naturally, other shapes could be envisaged for making anti-rotation plates. In particular, the plates could present arrangements of shape for the purpose of reducing their weight.

What is claimed is:

1. A pivot bushing for a variable-pitch vane of a turbomachine, the bushing configured to be mounted in a recess in a ring of the turbomachine, a shape of the recess being substantially complementary to a shape of the bushing, and the bushing comprising a substantially tubular body about a longitudinal axis, wherein the tubular body of the bushing is provided at one end with a first conical collar and at an opposite end with a second conical collar, the conical surfaces defined by the first conical collar and the second conical collar being disposed facing each other and project radially outwards from the tubular body relative to the longitudinal axis.

2. The bushing according to claim 1, wherein an angle of inclination of the conical surface defined by the first conical collar is substantially identical to an angle of inclination of the conical surface defined by the second conical collar.

3. The bushing according to claim 2, wherein the angle of inclination of the conical surfaces defined by the first conical collar and the second conical collar is within a range of 30 degrees to 60 degrees.

4. The bushing according to claim 3, wherein the angle of inclination of the conical surfaces defined by the first conical collar and the second conical collar is 45 degrees.

5. The bushing according to claim 4, wherein a mean diameter of the first conical collar and the second conical collar is substantially identical to a longitudinal distance between them.

6. The bushing according to claim 1, further comprising:
a surface on the bushing to communicate directly with a surface on the ring to prevent the bushing from turning in the recess.

7. The bushing according to claim 6, wherein the tubular body includes, between the conical collars, at least one projection defining a substantially plane surface for cooperating with a complementary surface of the recess in the ring in which the bushing is to be mounted so as to prevent the bushing from turning in said recess.

8. The bushing according to claim 1, wherein the bushing is made of a material having a coefficient of thermal expansion that is different from that of the ring in which the bushing is to be mounted.

9. The bushing according to claim 1, wherein the tubular body and one of the conical collars are two distinct parts.

10. A turbomachine ring including a plurality of recesses each for receiving a guide pivot of a variable-pitch vane, the ring further including a plurality of bushings according to claim 1, each mounted in a respective one of said recesses.

11. A turbomachine compressor including at least one ring according to claim 10.

12. A turbomachine including at least one ring according to claim 10.

13. The bushing according to claim 1, wherein the second conical collar includes at least one external projection extending along a vane axis of rotation, and the at least one external projection is configured to cooperate with an anti-rotation hoop to prevent the bushing from turning in the recess.

14. A pivot bushing for a variable-pitch vane of a turbomachine, the bushing configured to be mounted in a recess in a ring of the turbomachine, a shape of the recess being substantially complementary to a shape of the bushing, and the bushing comprising a substantially tubular body about a longitudinal axis, wherein the tubular body of the bushing is provided at one end with a first conical collar and at an opposite end with a second conical collar, the conical surfaces defined by the first and second collars being disposed facing each other, and wherein one of the conical collars presents at least one substantially longitudinal external projection for cooperating with a member for preventing the bushing from turning in the recess in the ring.

15. A pivot bushing for a variable-pitch vane of a turbomachine, the bushing configured to be mounted in a recess in a ring of the turbomachine, a shape of the recess being substan tially complementary to a shape of the bushing, and the bushing comprising a substantially tubular body about a longitudinal axis,
wherein the tubular body of the bushing is provided at one end with a first conical collar and at an opposite end with a second conical collar, the conical surfaces defined by the first and second collars being disposed facing each other, and
wherein one of the conical collars includes an anti-rotation plate provided with at least one surface for establishing substantially planar contact with a corresponding surface of an anti-rotation plate of an adjacent bushing.

* * * * *